United States Patent
Den et al.

(10) Patent No.: US 6,632,659 B1
(45) Date of Patent: Oct. 14, 2003

(54) APPARATUS AND METHOD FOR UV OXIDATION AND MICROBIOLOGICAL DECOMPOSITION OF ORGANIC WASTE AIR

(75) Inventors: Walter Den, Hsin Chu (TW); Massoud Pirbazari, Los Angeles, CA (US)

(73) Assignee: S.M. Sze, Hsinchu (TW)

( * ) Notice: Subject to any disclaimer, the term of this patent is extended or adjusted under 35 U.S.C. 154(b) by 0 days.

(21) Appl. No.: 09/500,894

(22) Filed: Feb. 9, 2000

(30) Foreign Application Priority Data

Sep. 10, 1999 (TW) ........................... 88115624 A

(51) Int. Cl.[7] .............................................. C12M 1/12
(52) U.S. Cl. .................. 435/297.1; 435/121; 435/186.3
(58) Field of Search ................................ 422/121, 168, 422/186.07, 186.3; 435/289.1, 297.1

(56) References Cited

U.S. PATENT DOCUMENTS 5,246,584 A * 9/1993 Donaldson et al. ......... 210/603
5,681,470 A * 10/1997 Safi .......................... 210/603

FOREIGN PATENT DOCUMENTS

| JP | 07116467 A | * 5/1995 | .......... B01D/53/70 |
| JP | 08243351 A | * 9/1996 | .......... B01D/53/70 |
| JP | 07115244 | * 10/1996 | |
| JP | 08281068 A | * 10/1996 | .......... B01D/53/72 |
| JP | 408281066 A | * 10/1996 | |
| JP | 0026995 | * 2/2000 | |

* cited by examiner

Primary Examiner—David A. Redding
(74) Attorney, Agent, or Firm—Darby & Darby

(57) ABSTRACT

The invention discloses an apparatus and a method for UV oxidation and microbiological decomposition of organic waste air. The invention provides an integrated system consisting of UV oxidation as a pretreatment process and biofiltration and biotrickling filtration, in which the organic pollutant residuals are decomposed with microorganisms.

16 Claims, 2 Drawing Sheets

APPARATUS AND METHOD FOR UV OXIDATION AND MICROBIOLOGICAL DECOMPOSITION OF ORGANIC WASTE AIR

BACKGROUND OF THE INVENTION

1. Field of the Invention

The present invention relates to an apparatus and a method for treating organic waste air. More particularly, the present invention relates to an apparatus and a method for UV oxidation and microbiological decomposition of organic waste air.

2. Description of the Related Arts

Organic waste air or organic off-gas means waste air containing organic pollutants. There are several common ways to treat volatile organic waste air in industry, including liquid adsorption, carbon adsorption, thermal incineration., catalytic incineration and bio-decomposition.

Liquid (e.g. basic aqueous solution) is employed in the method of liquid adsorption and activated carbon is employed in carbon adsorption. Organic waste air is then turned from gas form into liquid or solid form by means of its solubility or adsorbability into the liquid or activated carbon. Therefore, organic pollutants having different physical and chemical properties will have different removal efficiencies depending on the solubility of the liquid used or the adsorbability of the organic pollutants by activated carbon. In either case, the organic pollutants dissolved into the liquid or adsorbed into the activated carbon create a second set of contaminants that need to be treated in another way.

For example, carbon adsorption provides a temporary solution by transferring pollutants to the carbon surface, but fails to ultimately eliminate them. The spent carbon must be replaced or regenerated once it is saturated. On-site carbon regeneration may be accomplished by steam desorption or vacuum desorption, but both are cost-ineffective due to excessive energy consumption.

Another common method is thermal incineration, which is normally extremely energy intensive, requiring a nominal combustion temperature between 650° C. to 850° C. Typical levels of organic pollutant contained in common off-gas do not possess the required oxidation energy to sustain this temperature range. Therefore, the thermal incineration, even equipped with a heat transfer device, would demand a large quantity of auxiliary fuel.

Yet another common method is catalytic incineration, which involves precious or alkali metal as catalysts to lower the activation energy for combustion, consequently reducing the fuel cost needed for thermal incineration. Catalytic incineration is generally more cost effective than thermal incineration in treating organic pollutants at low concentration. However, due to its sensitivity to pollutant-laden air stream and process operating characteristics, the type of catalysts dictates the optimum operating conditions and lifespan of catalysts. Common catalysts deactivation problems (e.g. catalyst poisoning, masking, and fouling) are encountered due to chemical and physical interference by the impurities contained in the off-gas.

Still another common method is bio-decomposition. During the past decade, vapor-phase biofiltration has gained attention for both odor and organic pollutant control, mainly because of its efficiency and its low operating cost. In a biofilter, natural media such as peat, soil, and compost which contain indigenous microorganisms and essential nutrients, provide a natural environment for microorganisms to grow using (for example, organic pollutant) as carbon and energy source. However, these biofiltration systems are susceptible to both toxicity and excessive pollutant concentration. Consequently, pollutant emissions with highly fluctuating influent concentrations render this method questionable.

SUMMARY OF THE INVENTION

It is therefore a primary objective of the present invention to provide a new air pollution technology which offers both technical and economical advantages over the conventional methods described above.

To accomplish the above objective, the present invention provides a method for UV oxidation and microbiological decomposition of organic waste air, the method including (a) irradiating organic waste air with ultraviolet (UV) light, wherein the organic pollutants in the waste air undergo oxidation reaction; and (b) polishing the organic pollutant residuals with microorganisms.

The present invention further provides an apparatus for UV oxidation and microbiological decomposition of organic waste air, the apparatus including: a UV oxidation reactor having a UV lamp for irradiating organic pollutants; a humidifier for humidifying the organic waste air; an acid neutralizing device for neutralizing the acidity of the organic waste air; a biofilter containing mixtures of a support material and biosolids, wherein the biosolids contain microorganisms capable of metabolizing or biodegrading one or more of the organic pollutants and the support material is selected from the group consisting of yard waste, compost, activated carbon, molecular sieve and adsorbent; and a monitoring device for detecting the concentration of the organic pollutants.

Alternatively, the present invention also provides an apparatus for UV oxidation and microbiological decomposition of organic waste air, the apparatus including: a UV oxidation reactor having a UV lamp for irradiating organic pollutants; a biotrickling filter containing mixtures of a support material and biosolids, wherein the biosolids contain microorganisms capable of metabolizing or biodegrading one or more of the organic pollutants and the support material is selected from the group consisting of yard waste, compost, activated carbon, molecular sieve and adsorbent; a nutrient reservoir for supplementing the microorganisms with nutrition and water; a pH-monitoring device for monitoring the pH of the nutrient solution; an acid neutralizing device for neutralizing the acidity of the organic waste air; and a monitoring device for detecting the concentration of the organic pollutants.

BRIEF DESCRIPTION OF THE FIGURE

The present invention will be more fully understood and further advantages will become apparent when reference is made to the following description of the invention and the accompanying drawings in which.

DETAILED DESCRIPTION OF THE INVENTION

In accordance with the present invention, there is provided a method for UV oxidation and microbiological decomposition of organic waste air, which comprises irradiating organic waste air to UV, wherein the organic pollutants in the waste air undergo oxidation reaction, and then polishing the organic pollutant residuals with microorganisms. In the step of UV oxidation, an oxidant or a catalyst such as ozone, hydrogen peroxide or titanium dioxide may be added to increase the oxidation reaction.

In order to effectively mitigate the problems associated with chemical toxicity and fluctuating concentration while preserving the advantage of biofiltration process, this invention uses an integrated system consisting of a biofilter (or a biotrickling filter) preceded by a UV oxidation reactor to perform a pretreatment process. The pretreatment process is capable of chemically decomposing the structure of xenobiotic compounds by promoting the excited state of the pollutants, whereby chemical bonds are effectively broken, and then yielding byproducts that are more amenable to biodegradation by the biofilter (or a biotrickling filter). In essence, the biofiltration plays the role of a polishing process capable of mineralizing the organic pollutant residuals. This system has two important advantages: (1) protecting the microbial population from toxic shock, and (2) photochemically breaking down the pollutants into more easily biodegradable components, thereupon increasing the removal efficiency of the biofilter (or a biotrickling filter).

Figure 1:
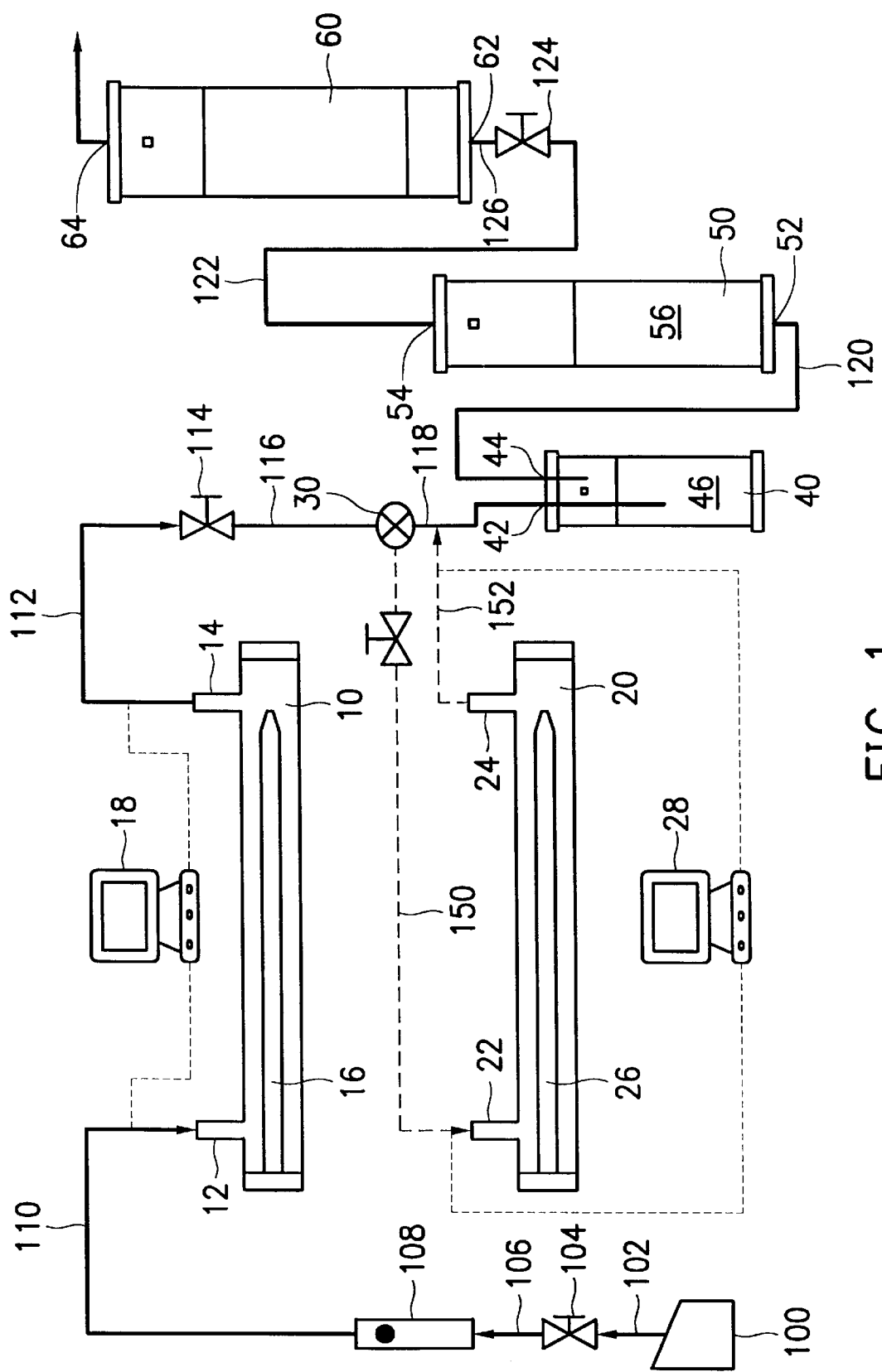
FIG. 1 is a diagram showing an apparatus, including a UV-oxidation reactor and a biofilter, for use in one preferred embodiment of the invention.
Figure 2:
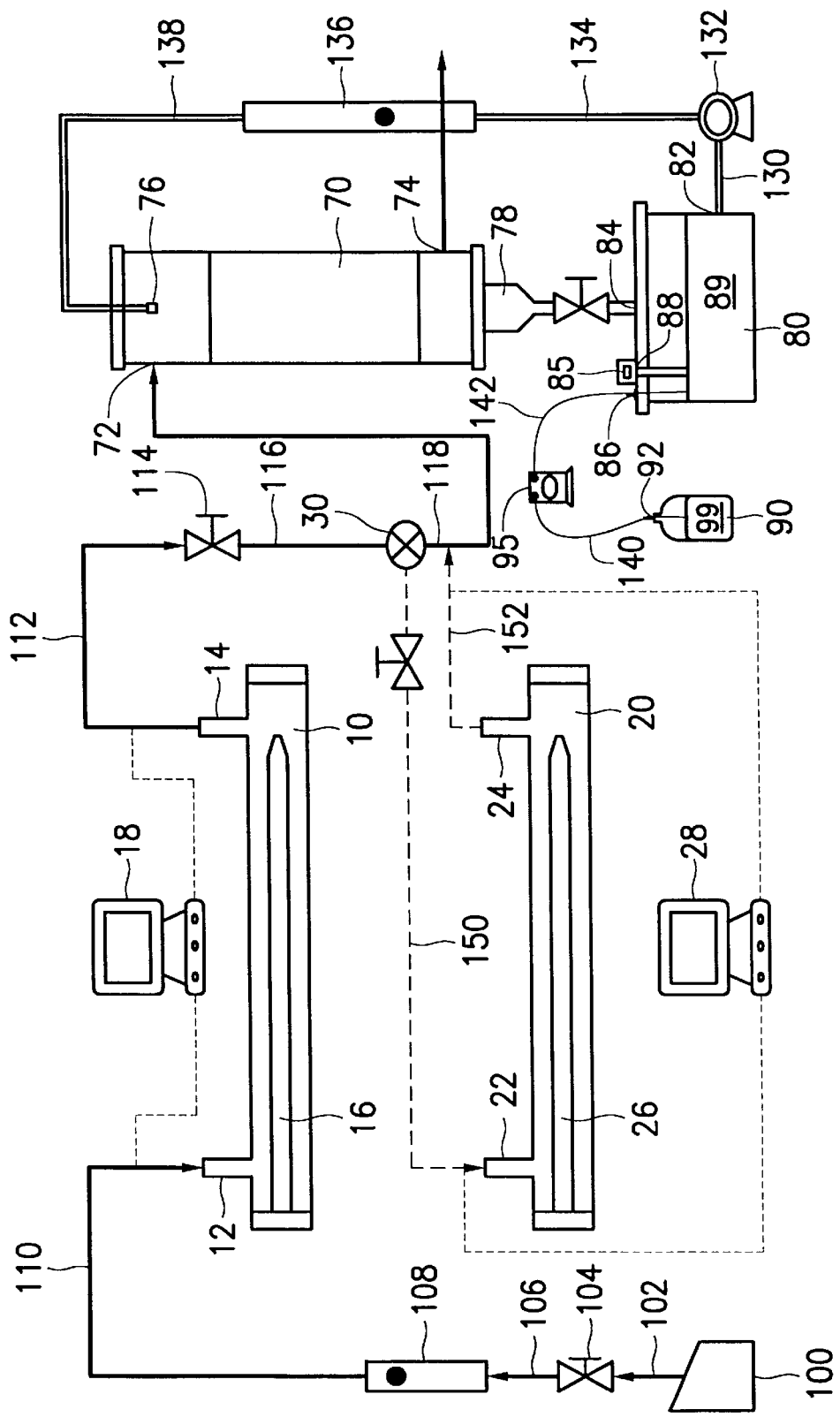
FIG. 2 is a diagram showing an apparatus, including a UV oxidation reactor and a biotrickling filter, for use in another preferred embodiment of the invention.

The present invention will be better understood by those skilled in the art by reference to FIG. 1 and FIG. 2. Referring to FIG. 1, an apparatus for UV oxidation and microbiological decomposition of organic waste air is provided according to the invention, comprising: a first UV oxidation reactor 10, a humidifying device 40, an acid neutralizing device 50 and a biofilter 60. The first UV oxidation reactor 10 comprises a UV lamp 16 for irradiating organic pollutants, a first monitoring device 18 for detecting the concentration of the organic pollutants, and a first inlet 12 and a first outlet 14, in which an oxidant or a catalyst such as ozone, hydrogen peroxide or titanium dioxide may be added, and the first monitoring device 18, which is connected with the first inlet 12 and the first outlet 14. The humidifying device 40 is for humidifying the organic waste air, and is provided with a second inlet 42 and a second outlet 44, wherein the second inlet 42 is connected with the first outlet 14. The acid neutralizing device 50 is for neutralizing the acidity of the organic waste air, and is provided with a third inlet 52 and a third outlet 54, wherein the third inlet 52 is connected with the second outlet 44. The biofilter 60 contains mixtures of a support material and biosolids, wherein the biosolids contain microorganisms capable of metabolizing or biodegrading one or more organic pollutants and the support material is selected from the group consisting of yard waste, compost, activated carbon, molecular sieve and adsorbent. The biofilter 60 is provided with a fourth inlet 62 and a fourth outlet 64, wherein the fourth inlet 62 is connected with the third outlet 54.

Referring to FIG. 2, another apparatus for UV oxidation and microbiological decomposition of organic waste air is provided according the invention comprising: a first UV oxidation reactor 10, a biotrickling filter 70, a nutrient reservoir 80, a pH-monitoring device 85, and an acid neutralizing device 90. The first UV oxidation reactor 10 comprises a UV lamp 16 for irradiating organic pollutants, a first monitoring device 18 for detecting the concentration of the organic pollutants, and a first inlet 12 and a first outlet 14, in which an oxidant or a catalyst such as ozone, hydrogen peroxide or titanium dioxide may be added, wherein the first monitoring device 18 is connected with the first inlet 12 and the first outlet 14. The biotrickling filter 70 contains mixtures of a support material and biosolids, wherein the biosolids contain microorganisms capable of metabolizing or biodegrading one or more organic pollutants and the support material is selected from the group consisting of yard waste, compost, activated carbon, molecular sieve and adsorbent. The biotrickling filter 70 has a fifth inlet 72, a fifth outlet 74, a first liquid inlet 76 and a first liquid outlet 78, wherein the fifth inlet 72 is connected with the first outlet 14. The nutrient reservoir 80 contains nutrient solution used for supplementing the microorganisms with nutrition and water. The nutrient reservoir 80 has a second liquid outlet 82, a second liquid inlet 84, a third liquid inlet 86 and a detection opening 88, wherein the second liquid outlet 82 is connected with the first liquid inlet 76, and the second liquid inlet 84 is connected with the first liquid outlet 78. The pH-monitoring device 85 is used for monitoring the pH of the nutrient solution, wherein the pH can be measured at the detection opening 88. The acid neutralizing device 90 is useful in neutralizing the acidity of the nutrient solution, and has a third liquid outlet 92 connected with the third liquid inlet 86.

Furthermore, the two above described apparatuses of this invention can be further provided with a second UV oxidation reactor 20, a second monitoring device 28 and a flow splitter 30 between the first outlet 14 and the second inlet 42 (or the fifth inlet 72). The second UV oxidation reactor 20 comprises a UV lamp 26 for irradiating organic pollutants, a second monitoring device 28 for detecting the concentration of the organic pollutants, a sixth inlet 22 and a sixth outlet 24, in which an oxidant or a catalyst such as ozone, hydrogen peroxide or titanium dioxide may be added, wherein the sixth outlet 24 is connected with the second inlet 42 (or the fifth inlet 72). The flow splitter 30 has 3 ports, wherein the first port is connected with first outlet 14, the second port is connected with the sixth inlet 22 on the second UV oxidation reactor, and the third port is connected with the second inlet 42 (or the fifth inlet 72), wherein the second port is controlled by the second monitoring device 28. The second port is opened when the concentration of organic pollutants is higher than the predeterminant value.

According to the present invention, using the UV oxidation as a pretreatment process can both protect microbial population from toxic shock and enhance the removal efficiency of the organic pollutant. Economically speaking, the present invention does not incur the costs associated with frequent carbon replacement in carbon adsorption, or catalyst poisoning in catalytic oxidation, or fuel cost associated with incineration.

The feature of the present invention is the integrated oxidation-biofiltration system, which combines UV oxidation with biodegradation to deal with high and fluctuating emission concentration of hazardous pollutants. The UV oxidation an example of advanced oxidation, which causes the organic pollutant enter an excited state, and subsequently undergo a series of free radicals chain reactions, whereby organic pollutants are decomposed. In addition, an oxidant or a catalyst such as ozone, hydrogen peroxide or titanium dioxide may be added into the UV oxidation reactor to increase the efficiency of oxidation.

The present invention can be provided with two workable UV oxidation reactors. If the concentration of organic pollutants is suddenly increased, and the concentration of effluent of the first UV oxidation reactor is higher than the predeterminant one, the second UV oxidation reactor is then be turned on for further oxidation. This design can ensure that the organic pollutants are in stable, low concentration before entering the biofilter or biotrickling filter, and thus provides an effective pretreatment step.

The biodegradation subsequent to UV oxidation plays the role of a polishing process capable of mineralizing the organic residuals and byproducts. Further, the acid neutralizing device will neutralize the acids derived from UV oxidation, so that the growth condition will be optimized for microorganisms to maintain high decomposing efficiency.

In general, the advantages of the present invention comprise: (a) The combination of UV oxidation, which is highly efficient, with biofiltration, which is highly economical, to obtain an effective means of dealing with high and fluctuating emission concentrations of hazardous pollutants; (b) The removal efficiency of the present invention can compare favorably with thermal incineration, but the process of the invention holds a cost advantage over thermal incineration; (c) As opposed to activated carbon and liquid adsorption, the present invention has no problem in a second set of contaminants; (d) The biofilter is preceded by UV oxidation as a pretreatment process for removing partial organic pollutants and stabilizing the concentration thereof, so that the apparatus of the present invention can protect microorganisms and thus increase the removal efficiency of the organic pollutants.

Without intending to limit it in any manner, the present invention will be further illustrated by the following examples.

EXAMPLE 1

The combination of UV oxidation reactor with biofilter was used in this example to treat organic pollutants in organic waste air. Detail descriptions of which follow:

UV oxidation Reactor:

A low-pressure mercury UV lamp with an output power of 4 Watts and primary radiation wavelength at 254 nm was used in the UV oxidation procedure. The lamp was fitted within an adjustable glass reactor, whose volume can be varied from 100 ml to 300 ml. Sampling ports were constructed at the inlet and outlet ends of the glass reactor. The model compound, trichloroethylene (TCE, see below), was analyzed frequently during the experimental run. The effluent stream was analyzed to investigate the presence or absence of oxidation byproducts.

Biofilter Column:

Bench-scale biofilter columns (60 cm high and 7 cm internal diameter) were constructed with plexiglass. An appropriate quantity of glass beads was placed in the inlet side of the column for structural support and uniform air distribution. Sampling ports were constructed along the length of column for sample withdrawal and analysis. A natural packing media (compost/wood bark mixture) was used in this study.

Biotrickling Column:

The biotrickling filter column has the identical dimension to the biofilter column previously described. The column was also packed with compost mixture, with the addition of porous rocks as the bulking agent. Nutrient solution was circulated through the filter to support growth and to maintain media pH.

The apparatus integrated the UV oxidation reactor with the biofilter (also see FIG. 1), which comprised UV oxidation reactors 10 and 20, a humidifier 40, an acid neutralizing device 50 and a biofilter 60.

Organic waste air was blown into a pipe 102 by means of fan/blower 100, introduced into the first UV oxidation reactor 10 from the first inlet 12 through valve 104, pipe 106, flow meter 108 and pipe 110. After being irradiated by UV light from the UV lamp 16, the waste air was emitted from the first outlet 14. The first monitoring device 18 monitored the concentration of the organic pollutants in the waste air.

The waste air was introduced into the humidifier 40 from the second inlet 42 through pipe 112, valve 114, pipe 116, flow splitter 30 and then emitted from the second outlet 44 after humidifying with water 46 contained in the humidifier 40.

Some of the organic pollutants in the waste air were halogen-containing organic compounds. After UV oxidation, some hydrogen halides (HX, for example, HF, HCl, HBr or HI) were produced, and such an acidic compound(s) were harmful to the growth of the microorganisms. Thus, the waste air was then introduced into the acid neutralizing device 50 from the third inlet 52 through pipe 120, neutralized with the basic solution 56 and then emitted from the third outlet 54. The device comprised a column packed with sodium hydroxide as a basic solution 56.

Finally, the waste air was introduced into the biofilter 60 from the fourth inlet 62 through pipe 122, valve 124 and pipe 126. After the decomposition of the residuals by the microorganisms contained in the biofilter 60, the waste air was then emitted from the fourth outlet 64.

EXAMPLE 2

The apparatus integrated UV oxidation reactor with biotrickling filter (also see FIG. 2), which comprised UV oxidation reactors 10 and 20, a biotrickling filter 70, a nutrient reservoir 80, a pH-monitoring device 85 and an acid neutralizing device 90.

Like the biofilter process described above, organic waste air was blown into a pipe 102 by means of fan/blower 100, introduced into the first UV oxidation reactor 10 from the first inlet 12 through valve 104, pipe 106, flow meter 108 and pipe 110. After irradiating to UV by UV lamp 16, the waste air was emitted from the first outlet 14. The first monitoring device 18 monitored the concentration of the organic pollutant in the waste air.

The organic waste air was then introduced into the biotrickling filter 70 from the fifth inlet 72 through pipe 112, valve 114, pipe 116, flow splitter 30 and pipe 118. After decomposing the residuals with the microorganisms contained in the biotrickling filter 70, the waste air was then emitted from the fifth outlet 74.

The nutrient solution 89 was introduced into the biotrickling filter 70 by the aid of pump 132, through the second liquid outlet 82, pipe 130, pump 132, pipe 134, flow meter 136, pipe 138 and the first liquid inlet 76. The nutrient solution 89 flowed downwards for supplementing the microorganisms with nutrition and water, and drained from the first liquid outlet 78 to the second liquid inlet 84 on the nutrient reservoir 80 for recirculation.

As mentioned above, some of the organic pollutants in the waste air were halogen-containing organic compounds. After UV oxidation, some hydrogen halides (HX, for example, HF, HCl, HBr or HI) were produced. In this example, the acid neutralizing device 90 was connected with the nutrient reservoir 80. The nutrient solution 89 came from the biotrickling filter 70, which adsorbed the acids derived from UV oxidation of the organic pollutants, was introduced into the nutrient reservoir 80 from the second liquid inlet 84, so that the nutrient solution 89 became more and more acidic. Thus, the apparatus was equipped with a pH-monitoring device 85 such as pH meter to measure the pH value of the recirculating nutrient solution 89 at the detection opening 88.

If the pH was less than a certain value (a certain pH value depended on what category of microorganisms used), the pump 95 was turned on, and the basic solution 99 contained in the acid neutralizing device (sodium hydroxide) 90 was pumped into the nutrient reservoir 80 through the third liquid outlet 92, pipe 140, pump 95, pipe 142 and the third liquid inlet 86 to neutralize the acidity of the nutrient solution.

Analytical Technique:

The volatile organic chemical (VOC) concentration was determined by Shimadzu 14B GC-FID equipped with a fused silica capillary column (Alltech AT-1, length, 30 m; i.d., 0.53 mm; film thickness, 1 μm). Due to the low concentration levels of the chlorinated VOC, a thermal desorption unit (Tracer-1000, Quadrex, Taiwan) was installed to enhance the detection limit of the instrument. The GC was set with the following conditions: injector temperature, 200° C.; detector temperature, 250° C.; oven temperature, 50° C. isothermal. Vapor samples were directly withdrawn from the reactors using disposable hypodermic syringes, and then manually injected into the GC-FID unit.

RESULT AND DISCUSSION

Generally, based on the theory of Grotthus-Draper and Einstein-Stark, in photoreaction, a molecule undergoes metastasis so that the molecule is in an excited state after absorbing photons. During this process, electrons transit from lower energy orbitals to higher ones. If electrons are on the bonding orbital, and the energy absorbed from light is enough to move the electrons to an anti-bonding orbital, the chemical bonds can be broken and thus undergone the free radicals reaction as follows:

$$A + h\nu \rightarrow A^* \quad (1)$$

$$A^* \rightarrow D_1 + D_2 \quad (2)$$

wherein: A is a initial reactant, $A^*$ is the excited state of A, $h\nu$ represents the energy of a photon, and $D_1$ and $D_2$ are the products of photoreaction, the products including atoms or free radicals to act an initiator for subsequent chain reaction. Usually, the chain reaction will not stop until the reactant is exhausted.

The maximum wavelength (λ) used for breaking various carbon bondings are disclosed by Legan (see, Legan, R. W. (1982) "Ultraviolet Light Takes on CPI Roles". Chemical Engineering, January, p.95). The wavelength emitted from mercury vapor lamp is 254 nm, but some chemical bonds cannot be broken directly by 254 nm (also see Table 1). Therefore, there is a need for an oxidant or catalyst to decompose all the organic pollutants.

TABLE 1

Energy needed for breaking some chemical bonds in organic compounds.

| Chemical bond | Energy for breaking bond (kcal/mol) | Max λ (nm) for breaking bond | At λ =254 nm, the bond broken or not |
|---|---|---|---|
| C—C | 82.6 | 346.1 | Yes |
| C=C | 145.8 | 196.1 | No |
| C≡C | 199.6 | 143.2 | No |
| C—Cl | 81.0 | 353.0 | Yes |
| C—F | 116.0 | 246.5 | No |
| C—H | 98.7 | 289.7 | Yes |
| C—N | 72.8 | 392.7 | Yes |
| C=N | 147.0 | 194.5 | No |
| C≡N | 212.6 | 134.5 | No |
| C—O | 85.5 | 334.4 | Yes |
| C=O | 176.0 | 162.4 | No |

TABLE 1-continued

Energy needed for breaking some chemical bonds in organic compounds.

| Chemical bond | Energy for breaking bond (kcal/mol) | Max λ (nm) for breaking bond | At λ =254 nm, the bond broken or not |
|---|---|---|---|
| (aldehyde) C=O | 179.0 | 159.7 | No |
| (ketone) C—S | 65.0 | 439.9 | Yes |
| C=S | 166.0 | 172.2 | No |

Belonging to one of the recalcitrant organics, trichloroethylene (TCE) was used herein as the representation of the organic pollutant, and tested for the removal efficiency by the two systems described above. Generally, the recalcitrant organics are non-biodegradable or slowly biodegradable. At present, the most common recalcitrant organics are halogenated organics, especially polychlorinated (more than 3 chlorine) organics.

In the present invention, trial 1 was the combination of UV oxidation with biofilter, wherein the support material of the biofilter was compost with a little limestone (calcium hydroxide) for increasing the anti-acidity of the biofilter. The limestone was also added in the acid neutralizing device to absorb some acid gases derived from decomposing of the organic pollutants. Trial 2 was the combination of UV oxidation with biotrickling filter, wherein the support material of the biotrickling filter was compost with a number of porous rocks for increasing the flow permeability of the biotrickling filter. The pH of the biotrickling filter was controlled through the nutrient reservoir, pH-monitoring device and acid neutralizing device, wherein the pH-monitoring device was a pH meter and the basic solution used in the acid neutralizing device was sodium hydroxide. Other conditions used for these two trials are listed in Table 2 below:

TABLE 2

| Items | | Trial 1 | Trial 2 |
|---|---|---|---|
| Organic pollutant | | TCE | TCE |
| Initial conc. | | 15–300 ppm | 50–300 ppm |
| UV oxidation | Wavelength | 254 nm | 254 nm |
| | Gas retention time | 2 sec | 3.75 sec |
| Biofiltration | Type of biofilter | Biofilter | Biotrickling filter |
| | Support material | Compost + limestone | Compost + porous rocks |
| | Conc. Of inlet | 2–3 ppm | 2–3 ppm |
| | Gas retention time | 2 min | 2 min |

The results are shown in Table 3 and table 4 below.

TABLE 3

Experimental results of UV oxidation performance.

| $C_{in}^{*1}$ (ppm) | Flow rate (ml/min) | Volume (ml) | $C_{UV}^{*2}$ (ppm) | Removal efficiency |
|---|---|---|---|---|
| 152.3 | 1600 | 200 | 3.1 | 98.0 |
| 70.0 | 1600 | 200 | 2.2 | 96.9 |
| 25.2 | 1600 | 200 | 1.8 | 92.9 |
| 44.1 | 800 | 100 | 1.3 | 97.1 |
| 48.4 | 1600 | 100 | 1.9 | 96.1 |
| 47.7 | 3000 | 100 | 3 | 93.7 |
| 48.4 | 1600 | 100 | 1.9 | 96.1 |

TABLE 3-continued

Experimental results of UV oxidation performance.

| $C_{in}*^1$ (ppm) | Flow rate (ml/min) | Volume (ml) | $C_{UV}*^2$ (ppm) | Removal efficiency |
|---|---|---|---|---|
| 48.6 | 1600 | 200 | 1.4 | 97.1 |
| 43.3 | 1600 | 300 | 1.1 | 97.5 |

*$^1 C_{in}$ = TCE influent concentration
*$^2 C_{UV}$ = TCE concentration after UV oxidation Table 3 shows the removal efficiency of UV oxidation, in which the intensity of UV is 4.4 mW/cm$^2$ and the retention time of the gas is 3.75 seconds. The parameters involved in the UV oxidation include TCE influent concentration, flow rate and reactor volume. From Table 3, the fluctuating influent concentration of TCE ranges from 25 to 150 ppm. After UV oxidation, the effluent concentration of each trial is below approximately 3 ppm, revealing that a stable low concentration of TCE can be obtained after the oxidation, and thus, in the following step of biodegradation, the microorganisms can be protected.

Similarly, the effect of flow rate (800, 1600 and 3000 ml/min) and reactor volume (100, 200 and 300 ml) is not significant, revealing the high performance and stability of UV oxidation.

TABLE 4

Biological treatment performance and overall treatment efficiency.

| Biofilter | | | Biotrickling filter | | |
|---|---|---|---|---|---|
| Time days | Bioefficiency $(1 - C_{bio}/C_{UV}) * 100\%$ | Overall efficiency $(1 - C_{bio}/C_{in}) * 100\%$ | Time days | Bioefficiency $(1 - C_{bio}/C_{UV}) * 100\%$ | Overall efficiency $(1 - C_{bio}/C_{in}) * 100\%$ |
| 1 | 12.8 | 89.3 | 1 | 17.2 | 95.9 |
| 2 | 16.7 | 91.8 | 2 | 23.9 | 96.6 |
| 4 | 45.2 | 94.4 | 3 | 59.9 | 98.4 |
| 6 | 79.2 | 98.1 | 5 | 78.2 | 99.3 |
| 9 | 88.8 | 98.7 | 9 | 89.5 | 99.6 |
| 11 | 93.4 | 99.2 | 15 | 89.9 | 99.6 |
| 13 | 93.1 | 99.2 | 17 | 89.4 | 99.5 |
| 16 | 94.2 | 99.3 | 20 | 90.9 | 99.7 |
| 18 | 78.3 | 98.0 | 23 | 91.0 | 99.7 |
| 20 | 63.8 | 96.5 | 25 | 90.6 | 99.7 |
| 22 | 60.3 | 96.0 | 31 | 90.4 | 99.6 |
| 25 | 66.5 | 96.9 | 34 | 89.5 | 99.5 |
| 27 | 39.2 | 94.2 | 36 | 86.2 | 99.5 |
| 30 | 58.0 | 96.1 | 40 | 87.2 | 99.5 |
| 32 | 15.8 | 93.5 | 44 | 86.4 | 99.5 |
| 35 | 36.6 | 94.3 | 47 | 82.8 | 99.3 |
| | | | 49 | 76.8 | 98.9 |
| | | | 52 | 77.7 | 99.3 |
| | | | 56 | 83.8 | 99.4 |
| | | | 58 | 82.0 | 99.4 |
| | | | 63 | 80.9 | 99.4 |
| | | | 65 | 81.3 | 99.4 |
| | | | 69 | 75.2 | 99.2 |
| | | | 73 | 76.5 | 99.2 |
| | | | 76 | 78.0 | 99.2 |

$C_{in}$ = TCE influent concentration
$C_{UV}$ = TCE concentration after UV oxidation
$C_{bio}$ = TCE concentration after biological degradation Table 4 shows the removal efficiency of both biofilter (trial 1) and biotrickling filter (trial 2) preceded by UV oxidation, in which the concentration of the influent TCE is about 3 ppm.

The overall biodegradation process is broadly classified into an acclimation phase, a stable removal phase and a filter acidification phase, respectively. The acclimation phase is defined when the concentration ratio of effluent TCE/ influent TCE ($C/C_{in}$) is higher than 0.25, and in this phase, the microorganisms are induced to decompose TCE. In the stable removal phase, the enzyme of the microorganisms work to remove TCE completely. The TCE removal efficiency of both trial 1 and 2 was higher than 95%. By combining with the UV oxidation, the overall TCE removal efficiency attained was higher than 98%, and no byproduct was detected in the effluent during this period (within the sensitivity range of detection).

In the filter acidification phase in trial 1, the bulk HCl produced by the oxidation of TCE caused the acid neutralizing device and limestone failure in the neutralization, so that the removal efficiency was decreased significantly. In trial 2, however, the basic solution in the acid neutralizing device was supplemented easily, and with the aid of pH meter for monitoring the pH of nutrient solution, making it possible to substantially prolong the life of biotrickling filter and maintain high removal efficiency over a long period. The supplementing of nutrient solution is preferably intermittent. In this way, not only can the pH of the biotrickling filter be effectively controlled, but also the high water content in biotrickling filter can be avoided, so that the space among the support materials does not be get clogged.

While the invention has been particularly shown and described with the reference to the preferred embodiment thereof, it will be understood by those skilled in the art that various changes in form and details may be made without departing from the spirit and scope of the invention.

What is claimed is:

1. A method for UV oxidation and microbiological decomposition of organic waste air, comprising:

(a) irradiating the organic waste air to a first UV treatment, wherein the organic pollutants in the organic waste air undergo a first oxidation reaction;

(b) irradiating the organic waste air to a second UV treatment, wherein the organic pollutants in the organic waste air undergo a second oxidation reaction;

(c) neutralizing the organic waste air by an acid neutralizing process to neutralize the pH value of the organic waste air after the first and second oxidation reaction; and (d) polishing the organic pollutant residuals of the organic waste air by passing the organic pollutant residuals through at least one biofilter with microorganisms.

2. The method as claimed in claim 1, wherein said step (a) or (b) further comprises the use of an oxidant or a catalyst during the first oxidation reaction or the second oxidation reaction.

3. The method as claimed in claim 2, wherein said oxidant comprises titanium dioxide ($TiO_2$).

4. The method as claimed in claim 2, wherein said oxidant comprises ozone ($O_3$) or hydrogen peroxide.

5. The method as claimed in claim 1, wherein a humidifying process for humidifying the organic waste air is practiced prior to said step (c).

6. The method as claimed in claim 1, wherein said step (c) comprises an addition of acid neutralizer.

7. The method as claimed in claim 6, wherein said acid neutralizer is hydroxide.

8. The method as claimed in claim 7, wherein said hydroxide is selected from the group consisting of calcium hydroxide, calcium carbonate and sodium hydroxide.

9. The method as claimed in claim 1, wherein said biofilter further comprises mixtures of a support material and biosolids, wherein said biosolids comprise microorganisms capable of metabolizing or biodegrading the organic pollutants.

10. The method as claimed in claim 9, wherein said support material is selected from the group consisting of yard waste, compost, activated carbon, molecular sieve and adsorbent.

11. The method as claimed in claim 10, wherein a part of said support material is made of hydroxide, for increasing the anti-acidity of said biofilter and absorbing some acid gases derived from decomposing of the organic pollutants.

12. The method as claimed in claim 11, wherein said hydroxide is selected from the group consisting of calcium hydroxide, calcium carbonate and sodium hydroxide.

13. The method as claimed in claim 1, wherein said biofilter may be replaced with the biotrickling filter.

14. The method as claimed in claim 13, wherein said biotrickling filter further comprises mixtures of a support material and biosolids, wherein said biosolids comprise microorganisms capable of metabolizing or biodegrading the organic pollutants.

15. The method as claimed in claim 14, wherein said support material is selected from the group consisting of yard waste, compost, activated carbon, molecular sieve and adsorbent.

16. The method as claimed in claim 15, wherein said support material is compost with a number of porous rocks for increasing the flow permeability of said biotrickling filter.

* * * * *